May 13, 1969  J. L. CRAWFORD  3,444,410
ALTERNATOR WITH MULTIPLE COIL ROTATING FIELD
Filed March 2, 1967  Sheet 1 of 2
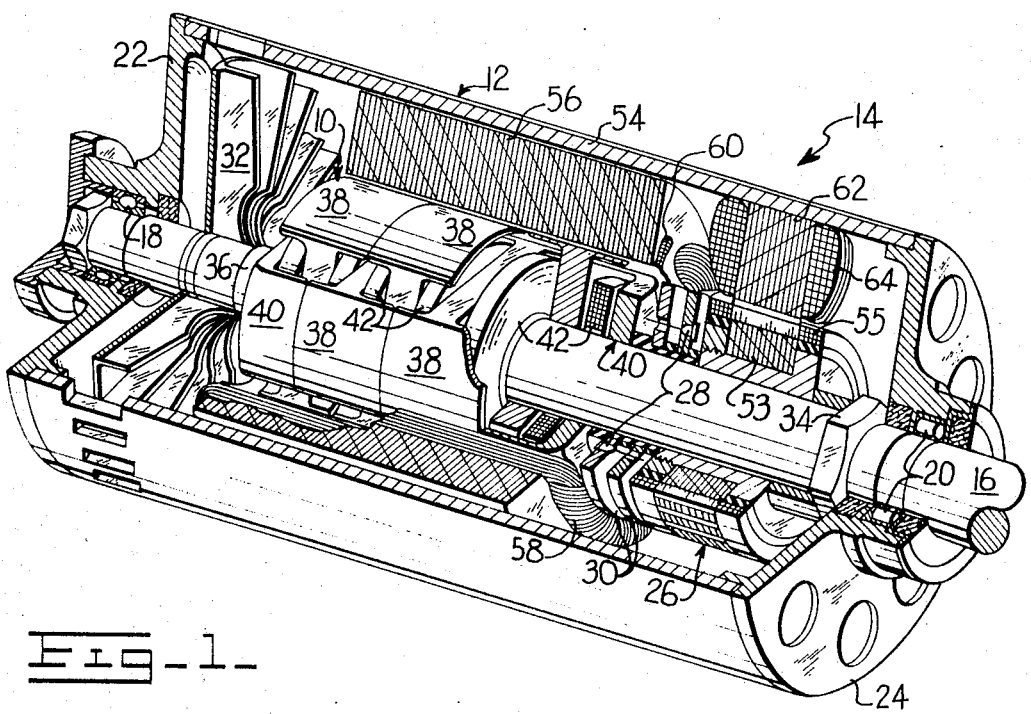
Fig-1-
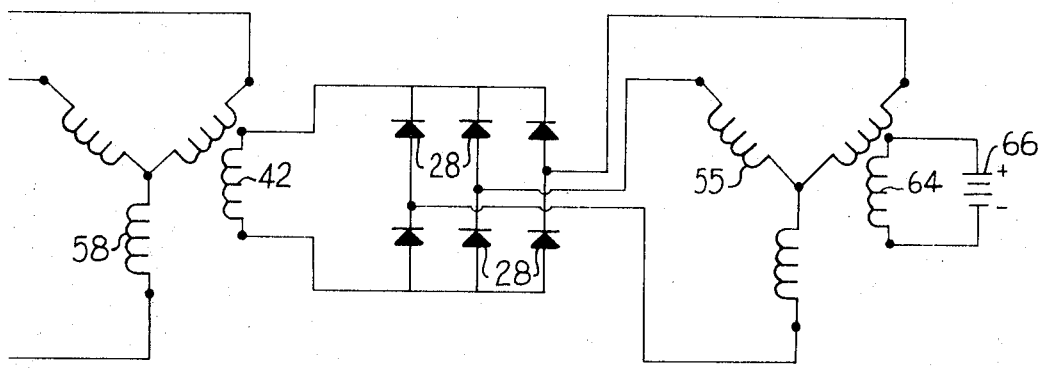
Fig-2-
INVENTOR.
JAMES L. CRAWFORD
BY
Fryer, Tjensvold, Feix & Phillips
ATTORNEYS

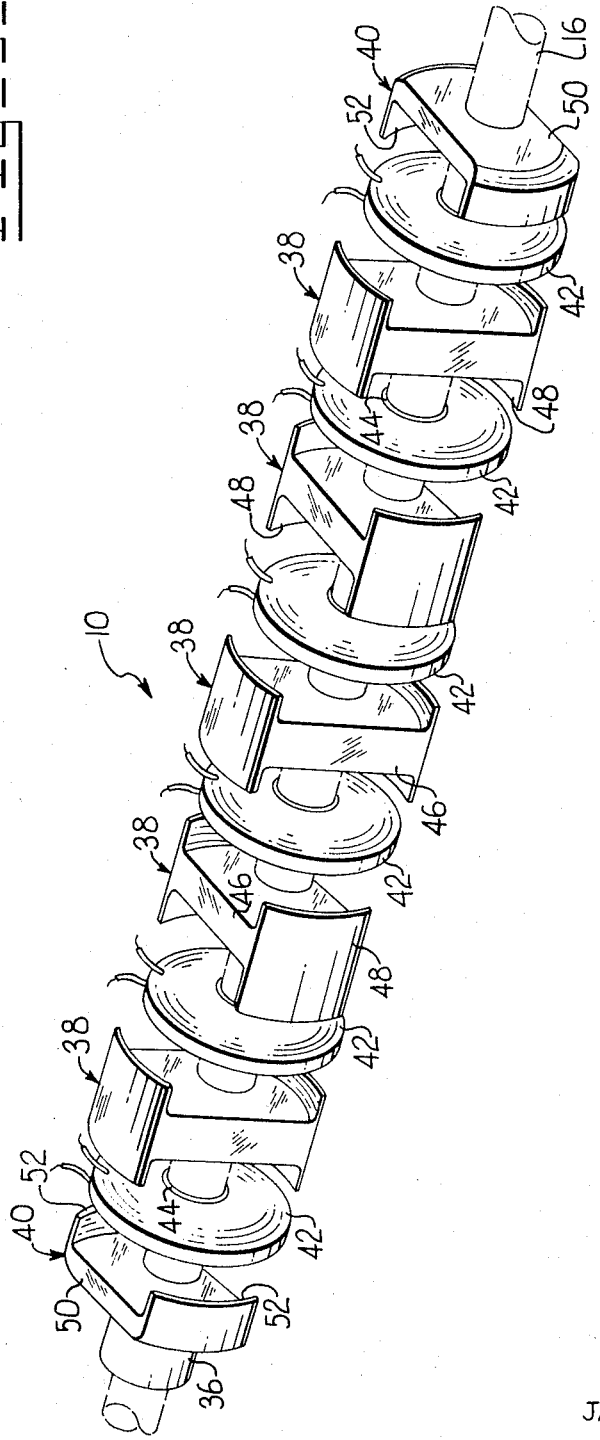

3,444,410
ALTERNATOR WITH MULTIPLE COIL ROTATING FIELD
James L. Crawford, Chillicothe, Ill., assignor to Caterpillar Tractor Co., Peoria, Ill., a corporation of California
Filed Mar. 2, 1967, Ser. No. 620,175
Int. Cl. H02h 1/22
U.S. Cl. 310—262            5 Claims

ABSTRACT OF THE DISCLOSURE

High speed alternator apparatus having a Lundell configuration of a steel core concentrically disposed on a shaft with internal field coils and further having a selectable plurality of field coils and associated rotor pole pieces integrally disposed about the common rotor shaft to provide a multiplicity of flux paths through the pole pieces to increase the usable field flux for a given amount of field coil excitation.

Background of the invention

The invention provides an improved design for a high-speed, relatively small but high output alternator device which can be driven, for example, at shaft speeds of the order of 12,000 r.p.m., and which is particularly useful therefore in vehicle electric drive systems. The Lundell type rotor configuration of previous mention uses a steel core concentric with a rotor shaft with a field coil wound concentrically within the core. The field core magnetizes two rotor segments which are mounted on the shaft on opposite sides of the coil. Thus, one segment is a south pole and the other is a north pole. These segments have fingers which extend parallel to the shaft and over the field coil. The fingers of each segment extend between the fingers of the other segment forming alternating north and south poles around the periphery of the rotor. A variation of this design utilizes a stationary field coil inserted into a hollow end of a cantilevered rotor constructed very much like the one described above. This eliminates the need for brushes to supply field current. This configuration lends itself to high speed operation because the field coil is mechanically strong, being wound concentric with the shaft and the rotor poles are solid iron and can be designed to withstand high forces.

Additional prior art alternator devices include the salient pole rotor configuration with field windings wound in a plane parallel to the axis of the rotor shaft around individual soft iron pole pieces, a cylindrical rotor configuration similar in appearance to the rotating armature of a common D.C. generator, and an inductor type alternator using an axially slotted rotor with no windings. The rotors of the salient pole configurations are not suitable for use at high speeds because of the difficulty of retaining the pole pieces and the field coils against high centrifugal forces, and the fact that the diameter of the rotor is necessarily large to accommodate the field windings. The cylindrical rotor configuration requires bonding of the coils and coil ends to retain them in the slots at high speeds. Further, the rotors must be hand wound by highly skilled workers, and both these disadvantages add to the cost of fabricating. The inductor type configuration, because it produces only half-wave voltages, must use twice as much material to obtain a given output, thus resulting in an inductor unit of severe size and weight. The conventional Lundell type of configuration is limited to a maximum of two field coils, which in turn limits the field flux, the device provides only a single flux path and requires a relatively large diameter for any given output.

Summary of the invention

The present invention utilizes a plurality of rotor pole pieces of special configuration in combination with a plurality of field coils disposed within and between associated ones of the plurality of pole pieces, to define an improved high-speed rotor configuration having a plurality of flux paths through the pole pieces, and a greater amount of usable field flux for a given amount of excitation of the field coils and a given size of the rotor configuration. The configuration, unlike the prior art rotors of above mention, lends itself to the use of a relatively large plurality of field poles and coils to provide an alternator of improved output for its size.

Thus, the invention provides a configuration which overcomes the shortcomings of the prior art by employing a unique configuration which provides the flexibility of using any of a desired plurality of pole pieces and field coils. That is, the ratio of the diameter to length of the rotor may be varied to suit the requirements desired. Thus, the output may be increased by adding a greater number of coils while increasing the length, or by increasing the rotor diameter and field coil size. In addition, the configuration allows the use of a relatively large diameter rotor shaft to provide an optimum flux path and increased mechanical strength, while reducing the possibility of vibration problems. Thus, the configuration of the invention in addition to supplying a more efficient use of flux paths, still provides the high mechanical strength of the concentrically wound coil system of the above-mentioned Lundell device, to thus allow its use in very high speed applications.

Brief description of the drawings

FIG. 1 is a perspective sectioned view of an assembled alternator employing the improved rotor configuration of the present invention;

FIG. 2 is a simplified schematic diagram of the circuit employed in the alternator of FIG. 1; and FIG. 3 is an exploded, perspective view of the improved rotor configuration of the invention.

Description of the preferred embodiment

Referring particularly to FIG. 1, there is shown an improved rotor assembly 10 of the invention, operatively assembled within a stationary stator assembly 12 of a self-excited alternator device 14. The rotor assembly 10 is supported in rotatable relation within the stator assembly 12 by a shaft 16 which in turn is supported at either end thereof by bearings 18 and 20 mounted in end frames 22 and 24, respectively. The shaft 16 also provides support for an exciter armature 26, rectifiers 28, heat sinks 30 and a fan 32, which elements are concentrically mounted in integral relation to define a generally conventional arrangement. The rotor assembly 10 as well as the elements 26–32 are keyed to the shaft 16 in a conventional manner (not shown) in order to maintain them fixed to the shaft in rigid angular locations, and the entire series of elements except for the fan 32 are axially clamped together between a nut 34 threadably disposed on the shaft 16, and a shoulder 36 (FIG. 3) formed on the shaft.

Referring to FIG. 3 in conjunction with FIG. 1, the rotor assembly 10 further comprises a plurality of center and end pole pieces 38 and 40, respectively, which are keyed to the shaft 16 and which define a configuration further described in greater detail below. A plurality of annular field coils 42 are alternately disposed between the succession of pole pieces 38, 40, and each coil is wound circumferentially around its respective core 44, to define a flat, disc-like shape, and the core 44 is in turn fitted onto the shaft 16. The field coils 42 are not keyed to the shaft 16 but are preferably retained solely by the clamping force exerted thereagainst by the adjacent, confining pole pieces 38, 40 and the nut 34. The plurality of field coils 42 are connected in electrical series across a DC excitation source and the intercoil connections are made such that successive coils as viewed from either end of shaft 16 are polarized oppositely to the preceding coil.

As shown in FIG. 3, the center pole pieces 38 are formed with identical configurations, which comprise a radially extending central segment 46 terminating in axially extending, arcuate fingers or pole tips 48 substantially perpendicularly secured at either end thereof, wherein the outer circumferential surface of the tips 48 define the respective pole faces. The segments 46 are perpendicularly oriented along the shaft 16 relative to succeeding or adjacent segments, such that the arcuate pole tips 48 of the adjacent segments extend axially beyond each other, forming thus alternately disposed north and south poles around the periphery of the rotor assembly 10 as described infra. The end pole pieces 40 have a configuration which generally resembles a pole piece 38 cut in half; that is, they are formed of a central segment 50 similar to segment 46 although of thinner material, wherein arcuate fingers or pole tips 52 are perpendicularly formed at the ends of the segments 50, which tips extend axially only in the direction towards the central pole pieces 38 contained therebetween.

The exciter armature 26 of previous mention is formed of a laminated core 53 keyed to the shaft 16, and adapted to retain thereon a generally conventional set of two-layer, three-phase coils 55. The coils 55 are electrically connected to the rectifying diodes 28, which in this particular device total six in number by way of example only, and which are securely fixed within the heat sinks 30. The heat sinks 30 are electrically insulated from each other to thus form busses for the rectified direct current. The busses or heat sinks 30 then are electrically connected across the serially-connected field coils 42, as further described hereinafter.

The stator assembly 12 of previous mention includes a cylindrical housing 54 concentrically fitted between the peripheries of the end frames 22–24, and lamination stack 56 concentrically mounted within the housing 54 in register with the rotor assembly 10 and adapted to retain stator three-phase windings 58 within slots 60 formed in the lamination stack 56. Exciter field poles 62 are concentrically secured within the housing 54 in register with the exciter armature 26, and exciter field coils 64 are secured about the poles 62.

As shown in FIG. 2, the exciter field coils 64 are connected to a source of direct current 66 such as a battery or a charging generator, and provide a stationary magnetic field which is coupled to the exciter armature coils 55 and thus the exciter core 53, which rotate therewithin. The three-phase alternating current produced by the exciter armature coils 55 is fed through the six rectifying diodes 28 mounted in the heat sinks 30. The diodes 28 are connected together as shown in the schematic to form a full-wave rectifier bridge. The bridge output is connected across the rotor assembly field coils 42. The flux produced by the rotatable field coils 42 moves past the stator three-phase windings 58 and induces an alternating voltage therein to provide the alternator 14 output. The stator three-phase windings 58 and the exciter armature coils 55 are herein shown wound in Y form by way of example only, and could also be wound in delta form.

In accordance with the improved rotor configuration of the invention, when current is passed through the rotor assembly field coils 42, each coil defines an electromagnet with its poles situated at the radially extending faces of the coils. Since alternate coils are polarized in opposite directions, when current flows through the coils the north poles of adjacent coils 42 face each other and the south poles of the coils face one another. The center pole pieces 38 which are confined between opposing north and south poles of the coils, and the end pole pieces 40 which are disposed against the outer face of each of the end coils 42, thus define respective north and south pole pieces.

Since alternate pole pieces 38 and 40 are angularly disposed on the shaft 16 in relation to adjacent pieces with the pole tips 48, 52 overlapping, and since alternate pole pieces are sandwiched between the north and south poles defined by the coils 42, the rotor assembly 10 of the invention forms a cylinder having alternate north and south poles around its periphery. The flux from the north pole pieces traverses a small air gap which is formed between the arcuate faces of the pole tips 48, 52 and the facing lamination stack 56, from whence it travels through the stator laminations. The flux then traverses back through the air gap between the stator laminations at a point opposite the south pole pieces and enters the south pole tips, whereupon it travels down through the pole pieces to the shaft 16 and through the centers of the adjoining coils 42, to complete the magnetic flux path.

In accordance with the invention, it may be seen that the flux quantity in each of the center pole pieces 38 is relatively greater than the flux quantity which can be generated in the prior art devices of previous mention because each pole piece has two flux sources supplied on each side thereof by the coils 42, and because each coil 42 has two flux paths available to it. Tests have shown that the total generated flux is increased on the order of 16% over the flux generated in prior art devices of similar size.

From the example given, those skilled in the art can visualize and fully understand other examples, from which it is evident that this invention provides a rotor configuration of improved magnetic characteristics and mechanical strength. For example, if desired, the shape of the individual pole members of the present invention could be varied to provide a rotor assembly with a greater number of poles than employed in the four pole embodiment shown in the drawings.

It will be understood that the embodiment of the invention here shown is only illustrative and that other embodiments can be devised within the scope of the appended claims.

I claim:

1. In a rotor assembly for use in a high-speed alternator device wherein the alternator device has a rotating field assembly and a stationary armature assembly, and the rotor assembly is supported on a shaft rotatably mounted within the alternator and generally defined by internal field coils disposed within a steel core concentrically secured about the shaft, the combination comprising: a plurality of field poles concentrically supported on said shaft and formed of radially extending center segments terminating in axially extending arcuate pole tips, and a plurality of annular coils concentrically disposed between successive ones of said plurality of field poles, said coils being disposed between the adjacent field poles and against the center segments thereof to confine the coils therebetween in magnetic bridging relation therewith, said plurality of alternate field poles and coils being arranged to define a plurality of flux paths through the pole pieces and the stator field assembly.

2. The rotor assembly of claim 1 wherein each pole piece has two flux sources supplying flux thereto, and wherein each field coil has at least two flux paths available thereto.

3. The rotor assembly of claim 2 wherein the radially extending surfaces of each of said plurality of field poles define magnetic north or south poles, and wherein adjacent field poles define a cylinder with alternate north and south poles disposed about the periphery thereof as determined by said confined field coils.

4. The rotor assembly of claim 3 wherein adjacent field poles are radially oriented in angular relation to each other, and the arcuate pole tips of a field pole extend axially beyond the arcuate pole tips of the adjacent field pole to thus provide the alternate north and south poles about the periphery of said rotor assembly.

5. The rotor assembly of claim 1 wherein said field poles comprise a plurality of center field poles concentrically secured to said shaft in angular relation to each other, said plurality of center field poles being terminated at the opposite ends thereof with a pair of end field poles with arcuate pole tips disposed relative to the pole tips of their respective adjacent center field poles to provide alternate north and south poles around the periphery of the rotor assembly and said field coils are disposed in confining relation between the plurality of center and end field poles with alternate ones of said coils being polarized oppositely to alternately provide opposing surfaces between adjacent coils which define alternate north and south poles.

References Cited

UNITED STATES PATENTS 2,897,383   7/1959   Barrows _____ 310—261

WARREN E. RAY, *Primary Examiner.*

R. SKUDY, *Assistant Examiner.*

U.S. Cl. X.R.

310—68